Aug. 16, 1938.   N. BREWER   2,126,867
ACID TREATMENT OF PETROLEUM WHITE OIL STOCK
Filed Aug. 7, 1936
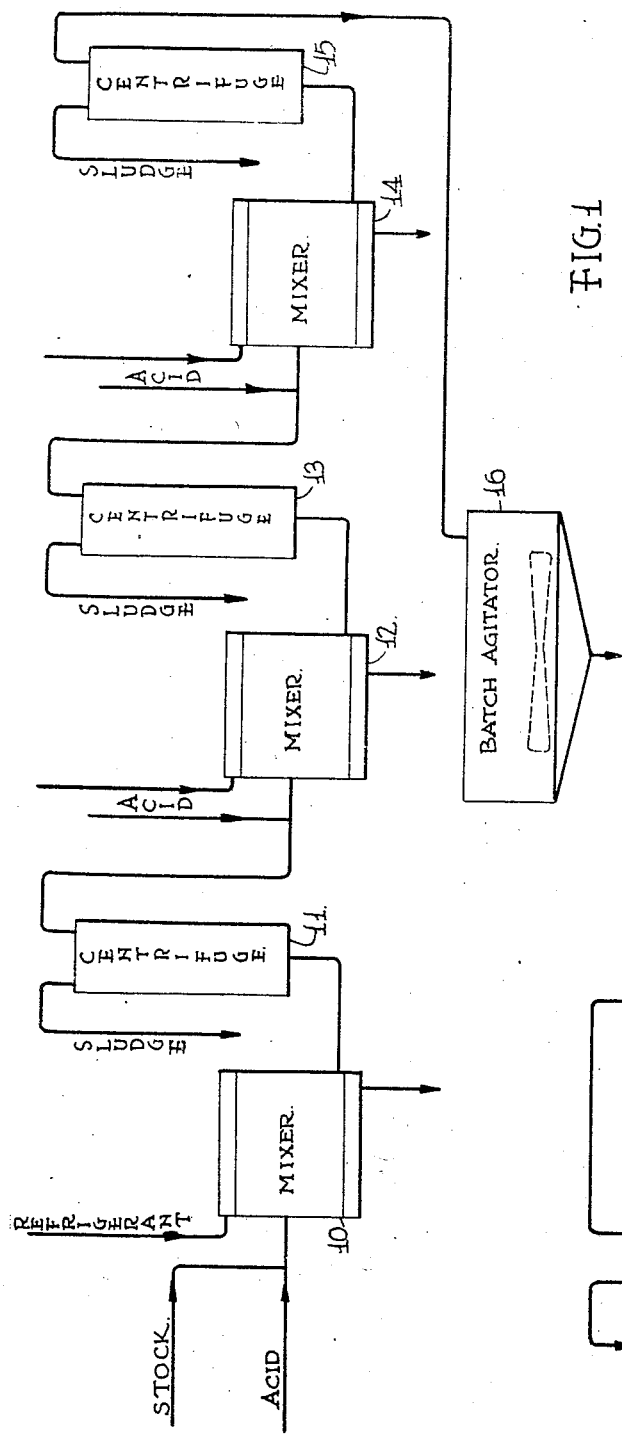
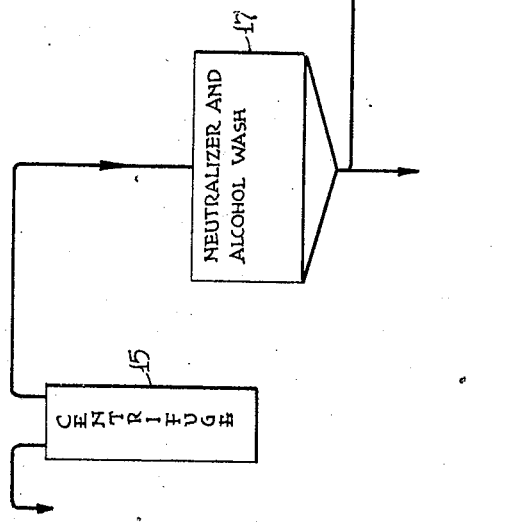
INVENTOR.
NATHANIEL BREWER.
BY *Maurice Q. Crews*
ATTORNEY.

Patented Aug. 16, 1938

2,126,867

UNITED STATES PATENT OFFICE 2,126,867

ACID TREATMENT OF PETROLEUM WHITE OIL STOCK

Nathaniel Brewer, Lansdowne, Pa., assignor to The Sharples Specialty Company, Philadelphia, Pa., a corporation of Delaware Application August 7, 1936, Serial No. 94,789

4 Claims. (Cl. 196—40)

The present invention pertains to the refining of petroleum stocks to produce white oil.

In the manufacture of white oil by processes of the prior art, it is customary to agitate the stock together with fuming sulphuric acid in a batch agitator for the purpose of removing unsaturated compounds and other impurities removed by such treatment. The sludge formed by the acid treatment is removed from the treated stock by gravity subsidence. By a succession of such treatments the oil is freed of unsaturated constituents and constituents which would affect its stability when subject to oxidation, sunlight or other factors. In addition to the sulphuric acid treatment, these stocks are washed with alcohol to remove sulphonates, neutralized with caustic soda and percolated through fuller's earth to obtain colorless oil. The procedure must be carefully controlled in each step of the process in order that the resulting colorless oil may possess the desired stability.

In order to test the stability of the final product, a sample is usually contacted with chemically pure sulphuric acid and heated to a temperature of 212° F. in contact with that acid. If the oil becomes darker than a pale amber color upon such contacting and heating, it is not considered to be adequately treated.

In order to test the degree of completeness of elimination of unsaturated compounds by the acid treating steps, the iodine number of the oil is determined. A satisfactorily treated oil should have a zero iodine number and should be capable of passing the acid test as discussed above.

In the practice of the conventional batch treating process discussed above with respect to white oil stocks, the temperature conditions must be carefully controlled in order to prevent any part of the oil from being heated to a temperature substantially in excess of 140° F. while in contact with acid. Since considerable heat is evolved as a result of the reaction of the stock with the acid, the treating operation is divided into a large number of separate steps, each involving mixing the oil with a small proportion of the total quantity of acid necessary to effect refining and a subsequent separation of sludge from oil prior to the succeeding treating step. In many cases, as many as ten or twelve successive treatments are necessary to effect adequate refining of the stock while avoiding local overheating of all parts of the oil.

The performance of the succession of batch treating steps discussed above requires the use of large amounts of fuming sulphuric acid and results in a considerable loss of oil.

Objects of the present invention have been to reduce the amount of sulphuric acid necessary to effect the treating operation, to improve the yield of refined oil and to simplify the general procedure discussed above. In the attainment of these objects, the oil is subjected to one or more operations of mixing with sulphuric acid of the required strength followed by centrifugal separation of sludge from treated oil. Since continuous mixing operations and centrifugal separation of treated oil from sludge have been suggested in connection with the treatment of other petroleum products in the prior art, and since this sequence of steps has resulted in savings of acid and improved yields of oil in connection with such stock, it was logical to assume that the same results could be obtained in the treatment of white oil stocks to produce white oil. In the practical performance of such a process, however, unforeseen difficulties were encountered, as will be discussed hereinafter, and the primary object of the present invention has been to overcome such difficulties in connection with a continuous treating process involving a sequence of mixing and centrifuging steps.

The objects of the invention and the manner in which they have been attained will be better understood by reference to the attached flow sheet in which, Figure 1 represents one embodiment of the invention, and Figure 2 represents a slight modification of the embodiment of Figure 1.

Referring to the drawing by reference characters, white oil stock and fuming sulphuric acid are first passed continuously into confluence and mixed in a continuous mixer 10. The mixer 10 is agitated and artificially cooled during the mixing operation in order to keep the temperature below any point at which burning of the oil and consequent fixation of color might occur. The quantity of acid employed in this initial mixing step is also carefully controlled, as the use of very large quantities of acid in connection with this mixing step would result in evolution of heat to an undesired degree which might result in permanent discoloration of the oil. In order to prevent this phenomenon, it is ordinarily preferable to limit the amount of acid used in the initial contacting step to a quantity representing less than 20% by weight based upon the weight of the oil. The mixing operation is relatively violent and may be accomplished by means of a mechanical agitator. By the use of a mixer of relatively small capacity and the employment of intense agitation in the performance of the mixing step, this mixing step and the resultant reaction can be accomplished in a very brief time, e. g., between one and two minutes. The mixture of sludge and oil so formed is passed continuously from the mixer 10 through a continuous centrifugal separator 11 designed to effect separation and continuous discharge of separated sludge and oil.

Oil discharged by the centrifuge 11 is preferably passed into confluence with a further quantity of acid which may bear about the same ratio to the quantity of oil under treatment as the acid mixed in the mixer 10 and this fresh acid is mixed with the oil in the mixer 12 in the same way as untreated stock and acid are mixed in the mixer 10. The mixture of sludge and stock passing continuously from the mixer 12 may be continuously separated in the centrifuge 13 and the mixing and centrifuging steps may be repeated with a further quantity of acid added to the oil effluent from the centrifuge 13, this effluent being mixed with fresh acid in the mixer 14 and the oil and sludge separated in the centrifugal separator 15.

While three stages of mixing and centrifuging have been illustrated in the drawing, it is to be understood that a larger number of such steps may be performed in case more stages are required to effect the desired degree of treatment.

By the performance of the sequence of steps thus far described, a white oil is produced which gives the desired iodine test of zero. Oils treated in this manner do not, however, satisfactorily pass the acid test discussed above, even in cases in which a larger quantity of acid is used for treating the stock than would be required in connection with the succession of batch treatments and separating steps involved in prior art procedure.

In the performance of the sequence of mixing and centrifuging steps of the present invention, discussed above, the iodine test indicates that the unsaturated constituents of the oil have been completely removed upon stepwise treatment with a total quantity of sulphuric acid which usually amounts to between 60 and 65% of the quantity of sulphuric acid required to effect such reduction of the iodine number in accordance with the batch prior art.

By the practice of the present invention as discussed hereinafter, oil treated by the sequence of mixing and centrifuging steps discussed above to reduce its iodine number can be subjected to a simple and economical further treatment which removes further constituents and produces an oil capable of passing the acid test, while avoiding the use of large additional quantities of acid and minimizing losses. To this end, the oil discharged from the centrifuge 15 is passed to an agitator 16 and mixed in bulk with a small quantity of fuming sulphuric acid. The quantity of sulphuric acid required in connection with this final treatment will ordinarily vary between 10 and 20% based upon the weight of the stock under treatment, depending upon the nature of that stock. The stock is agitated together with this additional quantity of acid in the agitator 16 until a thorough mixture of the stock and acid is formed, and the sludge is then allowed to settle from the stock by gravity subsidence. Such an operation ordinarily requires an agitating period of about fifteen minutes followed by prolonged settling and effects removal of residual undesired ingredients of the stock and enables the treated oil to pass the acid test. The temperature in the agitator 16 is preferably maintained at a point not substantially greater than 100° F. during this final batch treatment.

It will be seen that, by the combination of the continuous centrifugal treating process discussed above with the final step of batch agitation and gravity subsidence, a result is attained which cannot be obtained by either continuous centrifugal treatment or by agitation and gravity subsidence alone, no matter how many repetitions of such steps are performed. Thus, a smaller quantity of acid may be employed than is required to obtain a satisfactory oil by batch treatment, and a better quality of oil is obtained than can be obtained by the use of economical quantities of acid in connection with continuous mixing and centrifugal separation alone. In the performance of the process of the invention, a very much improved yield of oil is also obtained as compared with the yield obtained by a succession of batch agitating and gravity separating steps.

In the modification of Fig. 2, the stock passing from the centrifuge 15 is first subjected to alkali neutralization and washing with alcohol before being subjected to the final step of treatment with fuming sulphuric acid and gravity subsidence of sludge from the treated oil. In accordance with this modification, the oil from the centrifugal separator 15 is passed through an agitator 17 in which it is subjected to a succession of neutralizing and alcohol washing steps and it is thereafter passed to an agitator 18 in which it is subjected to an acid treatment of similar character to the treatment performed in the agitator 16 discussed above in connection with the first modification of this invention. The necessity of the performance of the intermediate neutralizing and alcohol washing steps depends upon the character of the particular stock under treatment.

Modifications will be obvious to those skilled in the art and I do not therefore wish to be limited except by the scope of the sub-joined claims. For example, in place of the fuming sulphuric acid discussed above, other refining acids capable of producing equivalent results may be employed. Similarly, instead of agitating the oil flowing from the centrifuge 15 with acid in a batch mixing operation, this oil may be mixed with the desired proportion of acid by a continuous mixing operation and the mixture passed into a receptacle in which the oil will separate from the sludge by gravity subsidence. The term "acid test" as used in the sub-joined claims is used to designate the acid test applied to treated white oils, as discussed above.

I claim:

1. In the acid treatment of petroleum stock to produce white oil, the process comprising continuously and intimately mixing the stock with a sulphuric acid capable of effecting removal of unsaturated constituents and other impurities, repeating the succession of mixing and centrifuging steps until an oil is produced from which the unsaturated constituents have been removed, promptly thereafter continuously centrifugally separating the resulting sludge from the oil, intimately mixing the oil so separated from the sludge with a further quantity of sulphuric acid and separating the refined oil from the sludge resulting from said further mixing operation by gravity subsidence.

2. In the acid treatment of petroleum stock to produce white oil, the process comprising intimately mixing the stock with a sulphuric acid capable of effecting removal of unsaturated constituents and other impurities, promptly thereafter centrifugally separating the resulting sludge from the oil, thereafter intimately mixing the oil centrifugally separated from the sludge with a further quantity of sulphuric acid, promptly after such second mixing operation centrifugally separating the resulting sludge formed by said second mixing operation from the oil, intimately mixing the oil so separated from the sludge with a further quantity of sulphuric acid and separating the refined oil from the sludge resulting from said last mentioned mixing operation by gravity subsidence.

3. In the acid treatment of petroleum stock to produce white oil, the process comprising intimately mixing the stock with a sulphuric acid capable of effecting removal of unsaturated constituents and other impurities while artificially cooling said stock, repeating the succession of mixing and centrifuging steps until an oil is produced from which the unsaturated constituents have been removed, promptly thereafter centrifugally separating the resulting sludge from the oil, intimately mixing the oil so separated from the sludge with a further quantity of sulphuric acid and separating the refined oil from the sludge resulting from said further mixing operation by gravity subsidence.

4. In the acid treatment of petroleum stock to produce white oil, the process comprising intimately mixing the stock with a sulphuric acid capable of effecting removal of unsaturated constituents and other impurities, repeating the succession of mixing and centrifuging steps until an oil is produced from which the unsaturated constituents have been removed, promptly thereafter centrifugally separating the resulting sludge from the oil, mixing the oil so separated from the sludge with an alkaline reagent, separating the products of reaction of the alkaline reagents with the oil from the oil, mixing the oil so separated from the alkaline reagent reaction products with a further quantity of sulphuric acid and separating by gravity subsidence the refined oil from the sludge resulting from said further mixing operation with sulphuric acid.

NATHANIEL BREWER.